UNITED STATES PATENT OFFICE.

HENRY A. KOHMAN, TRUMAN M. GODFREY AND LAUREN ASHE, OF PITTSBURGH, PENNSYLVANIA, ASSIGNORS TO WARD BAKING COMPANY, OF NEW YORK, N. Y., A CORPORATION OF NEW YORK.

MANUFACTURE OF BREAD.

1,204,280.  Specification of Letters Patent.  Patented Nov. 7, 1916.

No Drawing.  Application filed October 19, 1915. Serial No. 56,710.

*To all whom it may concern:*

Be it known that we, HENRY A. KOHMAN, TRUMAN M. GODFREY, and LAUREN ASHE, citizens of the United States, residing at Pittsburgh, Allegheny county, State of Pennsylvania, have invented certain new and useful Improvements in the Manufacture of Bread; and we do hereby declare the following to be a full, clear, and exact description of the invention, such as will enable others skilled in the art to which it appertains to make and use the same.

In the manufacture of leavened bread, it is customary to incorporate with the flour, yeast, salt, water, milk, and like ingredients of the dough batch, an appropriate quantity of a shortening agent, liquid at ordinary temperatures, and readily miscible therewith by the usual mixing and kneading apparatus employed in the trade. The purpose of this shortening agent, as is well known, is to lessen the toughness of the baked loaf, to mature and age the dough so that its cell walls shall be of a finer and thinner texture, thereby contributing to whitening the loaf, and contributing to homogeneity in the size and distribution of the cells in the finished product. With the ordinary dough batch, however, it is impracticable to increase the amount of liquid shortening employed beyond well established limits without seriously hampering the bread-making operation and without sacrifice of qualities in the finished product of a highly desirable character. Thus, from the operating standpoint, the dough, instead of being soft and sticky, should be fairly stiff, so that it will not tend to clog the dividing and molding machines, and so that it will have the springiness recognized as desirable in the dividing and molding operations. To obtain this stiffness or springiness of the dough batch, an appropriate amount of water should be employed. It is found, however, that the employment of a liquid shortening agent (say a vegetable oil, such as cotton-seed oil or the like) materially cuts down the amount of water which the dough will tolerate, and lessens the desired springiness of the batch. Moreover, in the finished loaf, the proportion of water present is likewise diminished, with a corresponding sacrifice of the normal freshness and flavor of the bread. Furthermore, to produce the desired shortening effect for bread of high quality, the quantity of the liquid shortener employed, although limited by the considerations just referred to, is often relatively considerable,—amounting, even in ordinary practice, to from 2 to 3 per cent. by weight of the flour employed in making up the dough batch.

The present invention is based upon the discovery that a shortening effect equal in value to that produced by relatively large quantities of liquid oil can be obtained by the employment of a hard fat, immiscible as such with flour at ordinary atmospheric temperatures, but which may be brought into homogeneous admixture therewith in various ways. So also, the employment of the hard fat is found to permit the use of sufficient water not only to supply the amount required for giving the desired stiffness and springiness to the dough, but to supply, in the baked loaf, the quantity recognized as desirable for imparting to the bread the expected freshness and flavor. The employment of the hard fat as the shortening agent is likewise found to add to the keeping qualities of the loaf, in the sense that even after the loaf has lost its original freshness, it lacks the rancidity frequently met with in ordinary bread which has been kept, under the same conditions, for the same period of time.

In the practice of the invention, I may use as the shortening agent, a hard fat of either vegetable or animal origin,—as, for instance, hydrogenated edible vegetable oil (say hydrogenated cotton-seed oil), hydrogenated edible animal oil, or oleo-stearin. In most instances, I prefer to use hydrogenated cotton-seed oil, or other hydrogenated vegetable oil of an edible character, for the reason that such hydrogenated oils are relatively cheap, and can be hydrogenated or hardened up to a high melting point readily and conveniently. Thus, cotton-seed oil having a melting point of 57° C. is well adapted to the purposes of the invention, and may be instanced as illustrating its preferred practice.

To incorporate the hard fat of high melting point, into the dough batch, we find it desirable to bring it first into homogeneous admixture with flour. This may be effected by melting the hard fat and heating it somewhat above its melting temperature and then mixing the flour therewith. The heating and mixing operation may conveniently be effected in a rotary drum, or the like, having a heating jacket, and provided interiorly with suitable mixing arms or stirrers. The temperature should be maintained, during the mixing operation, above the melting point of the fat, so that the flour shall not chill the mass, or the flour may be preheated, for the same purpose. It is found that, under these conditions, a quantity of flour equal in weight to from 5 to 10 times the weight of the melted fat will absorb the fat, and that the flour will nevertheless retain its pulverulent condition, at the termination of the mixing operation, and after cooling, and will otherwise be fully adapted for use as a part of the flour constituent of the dough batch. It is a characteristic merit of this way of incorporating the hard fat into the dough batch that it involves heating only a relatively small quantity of the flour. Thus if one pound of hard fat is to be added to a dough batch containing say 880 pounds of flour, it will suffice to absorb the fat in five to ten pounds of flour, in the manner described, and it is found that in the subsequent mixing and kneading of the dough batch, the shortening thus added to the relatively small amount of flour will be homogeneously distributed throughout the entire mass. This is a feature of advantage, for the reason that it involves the avoidance of heating the entire mass of flour up to the temperature of the small portion which has absorbed the fat, and eliminates the expense, inconvenience, and whatever injurious effect might be incident to such heating.

The hard fat may also be incorporated with the flour in the manner following: The melted fat heated up to a temperature of 200° C. and upward may be supplied from a suitable melting and heating receptacle or the like to a discharge pipe from which it may be ejected, at a correspondingly high temperature, in the form of a fine spray or cloud, by a jet of air of appropriate temperature, volume and pressure, into an inclosed chamber. Into this chamber, the flour may be sifted in a disseminated falling body; whereupon the colder particles of flour, coming in contact with the highly heated particles of fat sprayed into the chamber take up the fat. The flour thus impregnated with the melted fat remains in a pulverulent condition, after cooling, and is available for use as a part of the flour ingredient of the dough batch. In this case it is found that by repeating the absorbing operation a number of times, upon the same body of flour a quantity of flour from five to ten times the weight of the fat is sufficient to absorb the fat and yet remain in a pulverulent condition, suitable for admixture in making up the dough batch, and that, during the mixing and kneading operations, it is taken up homogeneously by the entire batch.

It is found that, with equally good results as to color, texture and expansion, a quantity of the melted fat incorporated with the flour in either of the ways described may be employed of approximately one-twentieth the weight of the cotton-seed oil used ordinarily in making up the dough batch. Thus, in those instances where from 2 to 3 per cent. of cotton-seed oil (calculated, by weight, on the amount of flour employed in the dough batch) was used, one-twentieth of that percentage, by weight, of hydrogenized cotton-seed oil having a melting point of 57° C. may be used, with like advantage as to the shortening effects desired, and with the production of a stiffer and springier dough, the viscosity of the dough being maintained, even though the absorption is increased, and the resultant baked loaf having the desired amount of moisture to give it the freshness and flavor desired.

It will be understood that, instead of using flour as the absorbent carrier for the melted hard fat, we may employ any other suitable pulverulent carrier, appropriate as an ingredient of the dough batch, as, for instance, some other starchy material than the flour constituting the main bulk of the batch. In some instances, instead of incorporating the hardened fat in the dough batch, by melting the fat, we may, with less advantage, mix it with an unsaturated or unhydrogenized vegetable oil, such as cotton-seed oil, so as to enable it to be incorporated in the dough batch at a lower temperature. Thus, by using as the shortening agent, 25% by weight of hardened cotton-seed oil of 57° C. melting point in admixture with 75% of unhydrogenized cotton-seed oil, a mixture is obtained which will produce the shortening effect desired although employed in quantity approximating only one-fourth, by weight, of the amount of liquid cotton-seed oil employed in the usual practice hereinbefore referred to. In this instance, however, the presence of the liquid cotton-seed oil forming a part of the fat employed has the disadvantage of proportionately cutting down the amount of water tolerated by the dough and, to that extent, lessens its stiffness and springiness.

We have also found that, provided that the hard fat is reduced to a sufficiently fine state of subdivision, it is available for use in the practice of the invention. Thus, the hard fat (say hydrogenized edible cotton-seed oil having a melting point of 57° C.) may be sprayed at a temperature above its melting point into a suitable cooling chamber, the conditions being so calibrated that the sprayed melted fat will be deposited in the chamber in the form of a fine powder. Those particles of this powder which are sufficiently small to pass through a sieve of 200 mesh to the square inch are of a subdivision sufficiently fine to be homogeneously absorbed by the dough batch in the course of the mixing and kneading thereof. In general, it will not be desirable to attempt to incorporate in the dough batch particles of melted fat obtained in this way, of a size materially larger than will pass through a sieve of the mesh referred to and, in fact, it is usually the preferred practice to absorb the melted fat by means of a pulverulent carrier as hereinbefore described.

What we claim is:

1. The method of making leavened bread, which comprises bringing a hard fat into homogeneous admixture with the flour, yeast, and other ingredients of the dough batch, and fermenting the batch; substantially as described.

2. The method of making leavened bread, which comprises bringing a hard fat into homogeneous admixture with the flour, yeast, and other ingredients of the dough batch, said homogeneous admixture being induced by first melting the fat and bringing it into a pulverulent condition, and fermenting the batch; substantially as described.

3. The method of making leavened bread, which comprises bringing a hard fat into homogeneous admixture with the flour, yeast, and other ingredients of the dough batch, said homogeneous admixture being effected by melting the fat, and bringing it into a pulverulent condition by absorption in a pulverulent carrier, and fermenting the batch; substantially as described.

In testimony whereof we affix our signatures.

HENRY A. KOHMAN.
TRUMAN M. GODFREY.
LAUREN ASHE.